United States Patent
Li et al.

(10) Patent No.: US 9,691,180 B2
(45) Date of Patent: Jun. 27, 2017

(54) DETERMINATION OF AUGMENTED REALITY INFORMATION

(71) Applicants: Qiang Li, Beijing (CN); Yurong Chen, Beijing (CN); Peng Wang, Beijing (CN); Yangzhou Du, Beijing (CN)

(72) Inventors: Qiang Li, Beijing (CN); Yurong Chen, Beijing (CN); Peng Wang, Beijing (CN); Yangzhou Du, Beijing (CN)

(73) Assignee: Intel Corporation, Santa Clara, CA (US)

( * ) Notice: Subject to any disclaimer, the term of this patent is extended or adjusted under 35 U.S.C. 154(b) by 182 days.

(21) Appl. No.: 13/976,094

(22) PCT Filed: Sep. 28, 2012

(86) PCT No.: PCT/CN2012/082311
§ 371 (c)(1),
(2) Date: Jul. 24, 2014

(87) PCT Pub. No.: WO2014/047876
PCT Pub. Date: Apr. 3, 2014

(65) Prior Publication Data
US 2016/0189425 A1    Jun. 30, 2016

(51) Int. Cl.
*G09G 5/22* (2006.01)
*G06T 19/00* (2011.01)
(Continued)

(52) U.S. Cl.
CPC .......... *G06T 19/006* (2013.01); *G06F 1/1626* (2013.01); *G06F 3/04815* (2013.01);
(Continued)

(58) Field of Classification Search
CPC .................................................. G06T 19/006
(Continued)

(56) References Cited

U.S. PATENT DOCUMENTS

| 2002/0054642 A1* | 5/2002 | Ma ........................ G06T 7/2026 375/240.16 |
| 2007/0183504 A1* | 8/2007 | Hoffman ............... G06T 7/2013 375/240.16 |

(Continued)

FOREIGN PATENT DOCUMENTS

| CN | 101827213 A | 9/2010 |
| CN | 201689383 U | 12/2010 |

(Continued)

OTHER PUBLICATIONS

International Search Report and Written Opinion received for PCT application No. PCT/CN2012/082311, mailed on Jul. 4, 2013, 10 pages.

(Continued)

*Primary Examiner* — Javid A Amini
(74) *Attorney, Agent, or Firm* — Jordan IP Law, LLC (57) ABSTRACT

Systems and methods may provide for obtaining or implementing augmented reality information. A logic architecture may be employed to detect a low acceleration condition with respect to an image capture device. The logic architecture may select data from a video associated with the image capture device in response to the low acceleration condition. The logic architecture may also use the data to obtain augmented reality information for the video. Additionally, the logic architecture may modify the video with the augmented reality information, or may display the video with the augmented reality information.

22 Claims, 6 Drawing Sheets

(51) Int. Cl.
G06F 1/16 (2006.01)
G06F 3/0481 (2013.01)
G06T 11/00 (2006.01)
G11B 27/10 (2006.01)
G11B 27/11 (2006.01)
G06F 17/30 (2006.01)
G06K 9/46 (2006.01)
H04N 5/225 (2006.01)

(52) U.S. Cl.
CPC .. *G06F 17/30247* (2013.01); *G06F 17/30784* (2013.01); *G06K 9/46* (2013.01); *G06T 11/00* (2013.01); *G11B 27/105* (2013.01); *G11B 27/11* (2013.01); *H04N 5/225* (2013.01); *G06F 2200/1637* (2013.01)

(58) Field of Classification Search
USPC .......................................................... 345/633
See application file for complete search history.

(56) References Cited

U.S. PATENT DOCUMENTS

| | | | |
|---|---|---|---|
| 2010/0309225 A1* | 12/2010 | Gray | G06F 17/30247 345/633 |
| 2011/0058609 A1* | 3/2011 | Chaudhury | G06T 7/2006 375/240.16 |
| 2011/0193985 A1 | 8/2011 | Inoue | |
| 2011/0223998 A1 | 9/2011 | Asano et al. | |
| 2011/0254930 A1* | 10/2011 | Sugimoto | H04N 7/0127 348/51 |
| 2011/0281644 A1 | 11/2011 | Kawamoto et al. | |
| 2011/0319160 A1* | 12/2011 | Arn | A63F 13/814 463/30 |
| 2012/0092329 A1* | 4/2012 | Koo | G06K 9/3258 345/419 |
| 2012/0243732 A1* | 9/2012 | Swaminathan | G06T 7/0042 382/103 |
| 2013/0071035 A1* | 3/2013 | Chandhok | G06F 17/3028 382/217 |
| 2013/0083221 A1 | 4/2013 | Horii | |
| 2013/0217441 A1 | 8/2013 | Kitatani et al. | |
| 2013/0223532 A1* | 8/2013 | Xi | H04N 19/56 375/240.16 |
| 2013/0276007 A1* | 10/2013 | Li | G06Q 50/01 725/12 |

FOREIGN PATENT DOCUMENTS

| | | |
|---|---|---|
| CN | 102214000 A | 10/2011 |
| CN | 102402778 A | 4/2012 |
| JP | 2007310840 A | 11/2007 |
| JP | 2010193067 A | 9/2010 |
| JP | 2011-076589 A | 4/2011 |
| WO | 2010058618 A1 | 5/2010 |
| WO | 2012-002149 A1 | 1/2012 |
| WO | 2012-060039 A1 | 5/2012 |
| WO | 2012060039 A1 | 5/2012 |

OTHER PUBLICATIONS

Office Action for Japanese Patent Application No. 2015527757, mailed on Aug. 16, 2016, 6 pages including 3 pages of English translation.
Office Action received for Japanese Patent Application No. 2015-527757, mailed on Feb. 23, 2016, 6 pages, including 3 pages of English translation.
Search Report for European Patent Application No. 12885878.4, mailed on Mar. 28, 2016, 7 pages.

\* cited by examiner

DETERMINATION OF AUGMENTED REALITY INFORMATION

BACKGROUND

Embodiments generally relate to determining or implementing augmented reality (AR) information. More particularly, embodiments relate to detecting an acceleration condition with respect to an image capture device and selecting data from a video associated with the image capture device, in response to the acceleration condition, to obtain AR information for the video. Embodiments also relate to modifying the video based on the AR information.

AR information may be obtained or used to modify a video associated with an image capture device. Obtaining the AR information, however, may require overly complex processes, such as calculating motion vectors to discover differences between successive frames of the video. Moreover, obtaining the AR information may include processes that may cause inaccurate results, such as sending video frames at regular time intervals for analysis. Also, obtaining the AR information may require that a substantial amount of data, such as every frame of the video, be continuously transmitted for analysis. Therefore, there may be unnecessary utilization of resources, such as processor utilization, power utilization, bandwidth utilization, and so on.

BRIEF DESCRIPTION OF THE DRAWINGS

The various advantages of the embodiments of the present invention will become apparent to one skilled in the art by reading the following specification and appended claims, and by referencing the following drawings, in which:

DETAILED DESCRIPTION

Figure 1A:
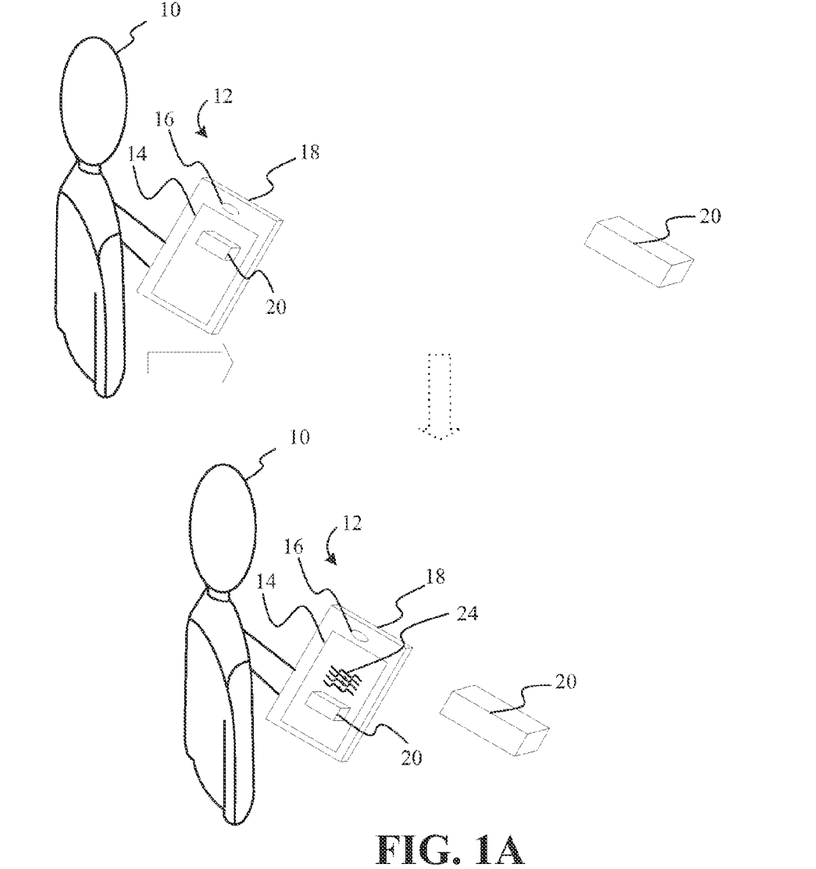
FIGS. 1A and 1B are examples of approaches to obtaining augmented reality (AR) information based on a low acceleration condition with respect to an image capture device according to an embodiment.

FIG. 1A shows an approach to obtain augmented reality (AR) information. In the illustrated example, an apparatus 12 includes a screen 14, a front-facing camera 16, and a rear-facing camera 18. The apparatus 12 may include any video display platform such as a laptop, personal digital assistant (PDA), wireless smart phone, media content player, imaging device, mobile Internet device (MID), any smart device such as a smart phone, smart tablet, smart TV, projector, eye glasses (e.g., goggles), and so on, or combinations thereof. The rear-facing camera 18 may capture a video of a real object 20, which is in the visual field of the apparatus 12, and a user 10 is able to observe the real object 20 on the screen 14. The video may be rendered in real-time, may be stored for viewing at a later time, or combinations thereof.

As the apparatus 112 approaches the real object 20, there is a high acceleration condition with respect to the apparatus 12. A sensor of the apparatus 12, such as an accelerometer, may detect the high acceleration condition and although the real object 20 is presented to the user 10 on the screen 14, no AR information is provided. When the user 10 pauses to observe the real object 20, there is a transition from the high acceleration condition to a low acceleration condition with respect to the apparatus 12. In one embodiment, detecting the low acceleration condition may be based on exceeding a threshold value, such as an acceleration threshold value, a classification threshold value, and so on, or combinations thereof.

Data may be automatically selected in response to the low acceleration condition. For example, the data may be automatically selected based on a predetermined period during the low acceleration condition. In one embodiment, the data includes a feature of the real object 20, an image of the real object 20, a single frame of the video including the real object 20, and so on, or combinations thereof. In addition, the data may be extracted from the video and used to obtain AR information about the video, such as information about the real object 20. For example, the data may be used to identify the real object 20 in the video, to identify information related to the real object 20 in the video, and so on, and combinations thereof. Moreover, the data may be analyzed at the apparatus 12, may be communicated to a remote apparatus (e.g., remote server) to analyze the data, or combinations thereof. In the illustrated approach, AR information 24 is obtained that includes information associated with the real object 20 and is presented in the video with the real object 20 to the user 10 on the screen 14 in response to the low acceleration condition.

Figure 1B:
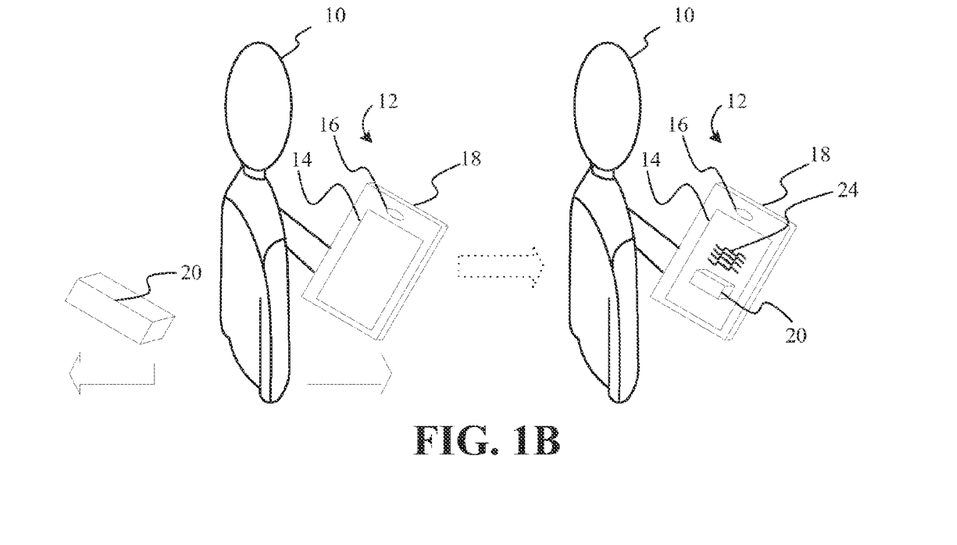

FIG. 1B shows another approach to obtain AR information. In the illustrated approach, either one or both of the apparatus 12 and the real object 20 are moving with respect to each other, and the accelerometer of apparatus 12 detects the high acceleration condition with respect to the apparatus 12. When the apparatus 12 and the real object 20 pass each other, the front-facing camera 16 or the rear-facing camera 18 captures the video of the real object 20 as it traverses the visual field of the apparatus 12. The video may be stored for viewing at a later time. When the user 10 pauses, for example to retrieve the video from storage, there is a transition from the high acceleration condition to a low acceleration condition with respect to the apparatus 12, and data from the video is automatically selected in response to the low acceleration condition. In the illustrated approach, AR information 24 is obtained that includes information associated with the real object 20 and is presented in the video with the real object 20 to the user 10 on the screen 14 in response to the low acceleration condition.

Figure 2:
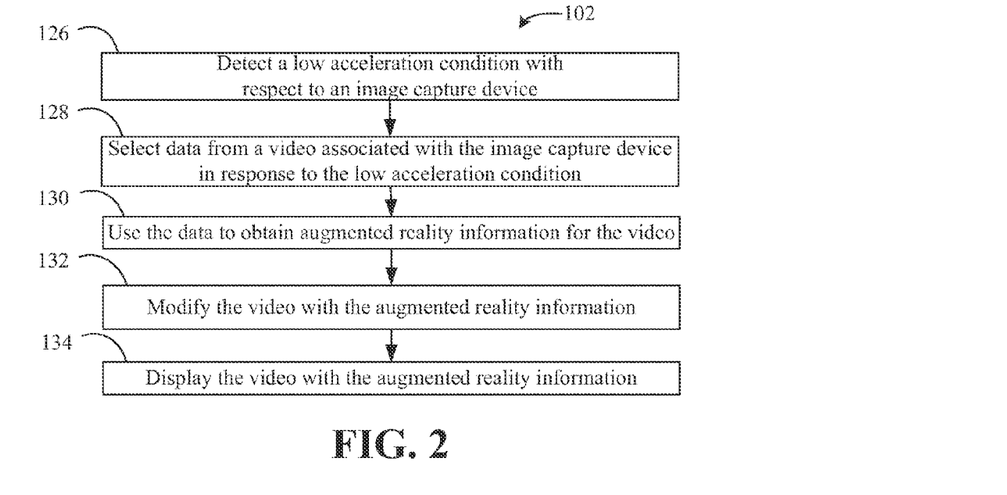
FIG. 2 is a block diagram of an example of a method of obtaining AR information based on a low acceleration condition with respect to an image capture device according to an embodiment.

Turning now to FIG. 2, a method 102 to obtain AR information is shown. The method 102 may be implemented as a set of logic instructions and/or firmware stored in a machine- or computer-readable storage medium such as random access memory (RAM), read only memory (ROM), programmable ROM (PROM), flash memory, etc., in configurable logic such as, for example, programmable logic arrays (PLAs), field programmable gate arrays (FPGAs), complex programmable logic devices (CPLDs), in fixed-functionality logic hardware using circuit technology such as, for example, application specific integrated circuit (ASIC), CMOS or transistor-transistor logic (TTL) technology, or any combination thereof. For example, computer program code to carry out operations shown in the method 102 may be written in any combination of one or more programming languages, including an object oriented programming language such as C++ or the like and conventional procedural programming languages, such as the "C" programming language or similar programming languages. Moreover, the method 102 could be implemented using any of the aforementioned circuit technologies.

Illustrated processing block 126 provides for detecting an acceleration condition, such as a low acceleration condition, with respect to an image capture device. The image capture device may include any platform, such as a laptop, PDA, wireless smart phone, media content player, imaging device, MID, any smart device such as a smart phone, smart tablet, smart TV, projector, eye glasses (e.g., goggles), and so on, or combinations thereof. In addition, the image capture device may include a sensor, such as a camera. The detection may be accomplished at any stage or component of the video pipeline, including a sensor, operating system, application, and so on, or combinations thereof. For example, a motion sensor (e.g., accelerometer) may detect the low acceleration condition. Moreover, the motion sensor may detect a transition between the low acceleration condition and a high acceleration condition, for example from the high acceleration condition to the low acceleration condition. Also, the motion sensor may detect the low acceleration condition based on a threshold value, such as an acceleration threshold value, a classification threshold value, or combinations thereof.

Illustrated processing block 128 provides for selecting data from a video associated with the image capture device in response to the acceleration condition, such as the low acceleration condition. The data may include a feature of any portion of the video. For example, the feature may be of a real object in the video, such as a feature of a person (e.g., facial recognition). Features may be determined by using any process, such as the scale invariant feature transform (SIFT), the compressed histogram of gradients (CHoG) descriptor, and so on, or combinations thereof. In addition, the data may include an image of the real object in the video, a frame of the video, and so on, or combinations thereof. The video or the data may include any format, such as joint photographic experts group format (JPEG), graphics interchange format (GIF), tagged image file format (TIFF), raw image file format (RAW), moving picture experts group format (MPEG), windows media video format (WMV) format, and so on, or combinations thereof.

The data may be selected at any stage or component of the video pipeline, including a sensor, network interface component, memory, storage, hard disk, operating system, application, and so on, or combinations thereof. For example, the data may be selected from the video when the video is received or accessible at any stage or component of the video pipeline, such as memory. In addition, the data may be automatically selected based on a predetermined period during the acceleration condition, such as during the low acceleration condition. Moreover, the data may be extracted at any stage or component of the video.

The data may be communicated to a remote processor, apparatus, system, and so on, or combinations thereof. For example, a network interface component may provide communication functionality for a wide variety of purposes, such as cellular telephone (e.g., W-CDMA (UMTS), CDMA2000 (IS-856/IS-2000), etc.), WiFi (e.g., IEEE 802.11, 1999 Edition, LAN/MAN Wireless LANS), Bluetooth (e.g., IEEE 802.15.1-2005, Wireless Personal Area Networks), WiMax (e.g., IEEE 802.16-200.4, LAN/MAN Broadband Wireless LANS), Global Positioning Systems (GPS), spread spectrum (e.g., 900 MHz), and other radio frequency (RE) telephony purposes. In addition, the data may be stored or used in a local device relative to the user (e.g., a mobile device of the user).

Illustrated processing block 130 provides for using the data to obtain the AR information for the video. In one embodiment, the data may be analyzed to obtain the AR information. For example, the data may be identified. A feature of the video may be identified, an object in the video may be identified, an image of the video may be identified, a frame of the video may be identified, and so on, or combinations thereof. In addition, information related to the feature may be identified, information related to the object may be identified, information related to the image may be identified, information related to the frame may be identified, and so on, or combinations thereof. Any process may be used to analyze the data to obtain the AR information.

For example, a pair-wise feature-matching process may match a query image against a database image. The process may include performing a pair-wise comparison on a short list of candidates most likely to match the query image. Indexing of features may also include any process, such as using approximate nearest neighbor search of SIFT descriptors with a best-bin-first strategy, a BoF model using a BoF codebook constructed by a K-means clustering of a training set of descriptors, using a codebook constructed including a hierarchical k-means clustering to create a vocabulary tree (VT), using a locally-sensitive hashing process, using any other tree-based processes, and so on.

A geometric verification process may also be used to analyze the data. For example, feature location information in the query image and the database image may be used to confirm that feature matches are consistent with a change in view point between the two images. Any process may be used to perform geometric verification. For example, a regression process such as random sample consensus may be used, checks based on feature-orientation information may be used, re-ranking before the regression process may be used, and so on.

The AR information may be obtained from the analysis of the data. For example, there may not be any identifying information in selected data (e.g., a query image) of a CD cover. The AR information may be obtained from a pair-wise comparison of the query image and a database image. For example, viewing a CD cover may cause the pair-wise comparison to identify the CD cover, and to determine information related to the CD such as the copyright, release date, author, title, and so on, or combinations thereof. The information may be determined from the same database performing the matching process, or may be determined from another database such as an Internet server database.

The illustrated method 102 also provides for implementing the AR information. For example, illustrated processing block 132 provides for modifying the video with the AR information. The video may be modified at any stage or component of the video pipeline, including a sensor, network interface component, memory, storage, hard disk, operating system, application, and so on, or combinations thereof. In addition, the video may be modified with the AR information when the AR information is determined. Moreover, the video may be modified with the AR information when the AR information is received, accessible, and so on, or combinations thereof. For example, the video may be modified when the AR information is received or accessible from a remote device, from a network interface component, from memory, from storage, and so on, or combinations thereof. The video may be modified to include the AR information in the video, for example by overlaying the AR information on a related real object in the video.

Illustrated processing block 134 provides for displaying the video with the AR information. The display device may be any platform, such as a laptop, PDA, wireless smart phone, media content player, imaging device, any smart device such as a smart phone, smart tablet, smart TV, projector, eye glasses (e.g., goggles), and so on, or combinations thereof. Accordingly, the modified video including the AR information may be presented to a user quickly, accurately, automatically, and so on, or combinations thereof.

Figure 3:
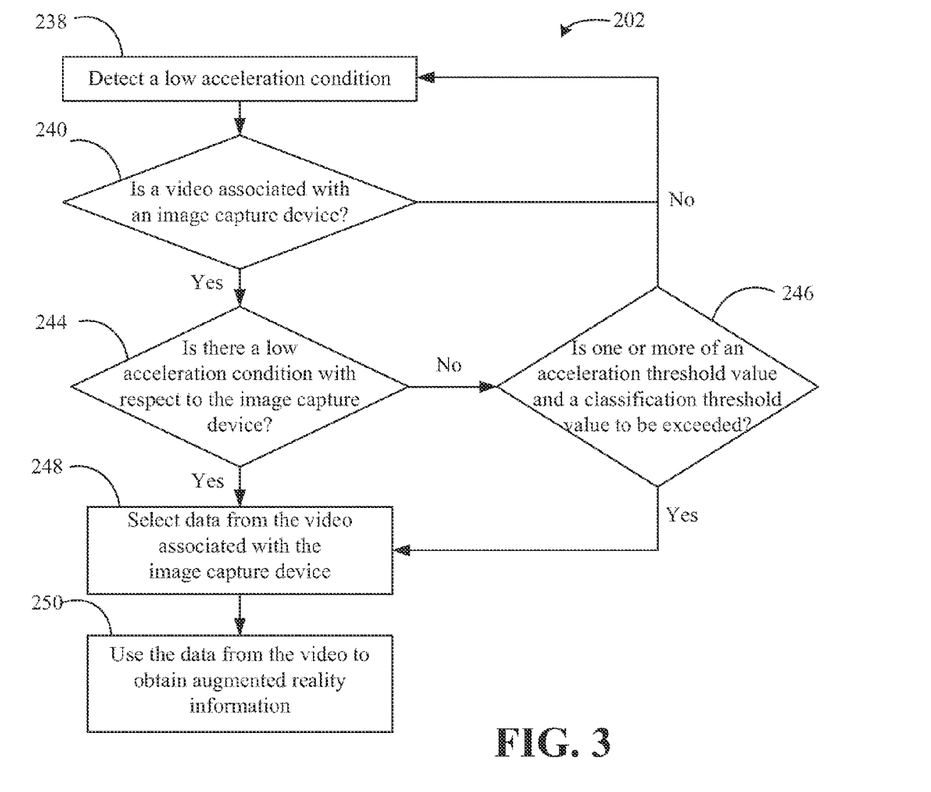
FIG. 3 is a flowchart of an example of a method of obtaining AR information based on a low acceleration condition with respect to an image capture device according to an embodiment.

FIG. 3 shows a method 202 for obtaining AR information. The method 202 could be implemented using any of the herein mentioned technologies. The illustrated processing block 238 detects a low acceleration condition. A determination may be made at block 240 to determine if a video is associated with an image capture device. For example, the video may be presented by a display device including an image capture sensor (e.g., camera), may be selected for display (e.g., from storage, memory, etc.), and so on, or combinations thereof. If the video is not associated with the image capture device, detecting the low acceleration condition may be accomplished at a later time. If the video is associated with the image capture device, a determination may be made at block 244 to determine if there is a low acceleration condition with respect to the image capture device. If not, a determination may be made at block 246 to determine if a threshold value may be exceeded. For example, a determination may be whether an acceleration threshold value may be exceeded, whether a classification threshold value may be exceeded, or combinations thereof. If so, there may be a transition to the low acceleration condition. When there is a low acceleration condition with respect to the image capture device, or when there is a transition to the low acceleration condition, a selection of data from the video is made at processing block 248, and the data is used at processing block 250 to obtain AR information.

Figure 4:
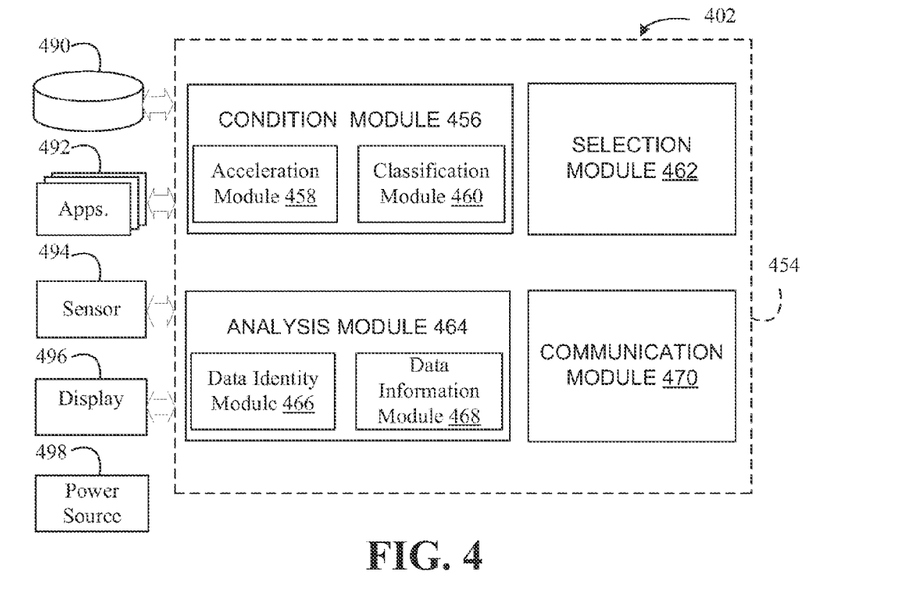
FIG. 4 is a block diagram of an example of a logic architecture according to an embodiment.

Turning now to FIG. 4, an apparatus 402 includes a logic architecture 454 to obtain AR information. The logic architecture 454 may be generally incorporated into a platform such as a laptop, PDA, wireless smart phone, media player, imaging device, MID, any smart device such as a smart phone, smart tablet, smart TV and so on, projector, eye glasses (e.g., goggles), server, and so on, or combinations thereof. The logic architecture 454 may be implemented in an application, operating system, media framework, hardware component, or combinations thereof. The logic architecture 454 may be implemented in any component of the video pipeline, such as a network interface component, memory, processor, hard drive, operating system, application, and so on, or combinations thereof. For example, the logic architecture 454 may be implemented in a processor, such as central processing unit (CPU), a graphical processing unit (GPU), a visual processing unit (VPU), a sensor, an operating system, an application, and so on, or combinations thereof. The apparatus 402 may include a power source 498, such as a battery, a power connector, and so on, or combinations thereof.

In the illustrated example, the logic architecture 454 includes a condition module 456 to detect an acceleration condition, such as a low acceleration condition, with respect to an image capture device. The condition module 456 may include an acceleration module 458 to detect a high acceleration condition, the low acceleration condition, and so on, or combinations thereof. The acceleration module 458 may also detect when an acceleration threshold value may be exceeded. The acceleration module 458 may also determine a transition, for example a transition to the low acceleration condition. In addition, the condition module 456 may include a classification module 460 to detect when a classification threshold value may be exceeded. In one embodiment, the classification module 460 may determine if the acceleration condition may remain constant for a period of time.

In the illustrated example, the logic architecture 454 includes a selection module 462 to select data from a video associated with the image capture device (e.g., sensor 494), in response to the low acceleration condition, and wherein the data may be used to obtain AR information for the video. The selection module 462 may extract a feature from the video, a query image from the video, a frame from the video, and so on, or combinations thereof. The selection module 462 may select the data based on a predetermined period during the acceleration condition, such as during the low acceleration condition. For example, the data may be selected at the start of the low acceleration condition, after the start of the low acceleration condition, randomly between the start the low acceleration period and the classification threshold value, after the classification threshold value has been exceeded and before a transition to the high acceleration condition, and so on, or combinations thereof.

In the illustrated example, the logic architecture 454 also includes an analysis module 464 to analyze the data. The analysis module may include a data identity module 466 to identify a feature in the video, an object in the video, an image in the video, a frame in the video, and so on, or combinations thereof. For example, the data (e.g., a query image) may include a feature (e.g., a landmark) of a street, and the feature may be identified using a pair-wise comparison between the query image and an image in a database (e.g., database image). Other information may be used to identify the feature, including location information (e.g., GPS information), which may be used to identify the query image, may be used to choose the appropriate database image, and so on, or combinations thereof. The analysis module may also include a data information module 468 to identify information related to the data in the video. For example, information that describes the data (e.g., name of the landmark) may be identified from a local database, such as in storage 490, or a remote database, such as in an online Internet server. In addition, the other information may be used to identify information related to the data in the video.

In the illustrated example, the logic architecture 454 also includes a communication module 470 to allow the logic architecture 454 to communicate with components, such as the storage 490, the applications 492, the sensor 494, the display 496, and so on, or combinations thereof. For example, the condition module 456 may directly communicate, or may use the communication module 470 to communicate, with the sensor 494 to detect an acceleration state. In addition, the select module 462 may directly communicate, or may use the communication module 470 to communicate with, the storage 490 to select the data. Moreover, the AR information obtained from the analysis module 464 may be directly communicated to the storage 490, the applications 492, the display 496, etc., or may be communicated using the communication module 470, such that the AR information may be presented with the video. In one embodiment, the communication module 470 may communicate, or be integrated, with a network interface component. While examples have illustrated separate modules, it is apparent that one or more of the modules of the logic architecture 454 may be implemented in one or more combined modules.

Figure 5:
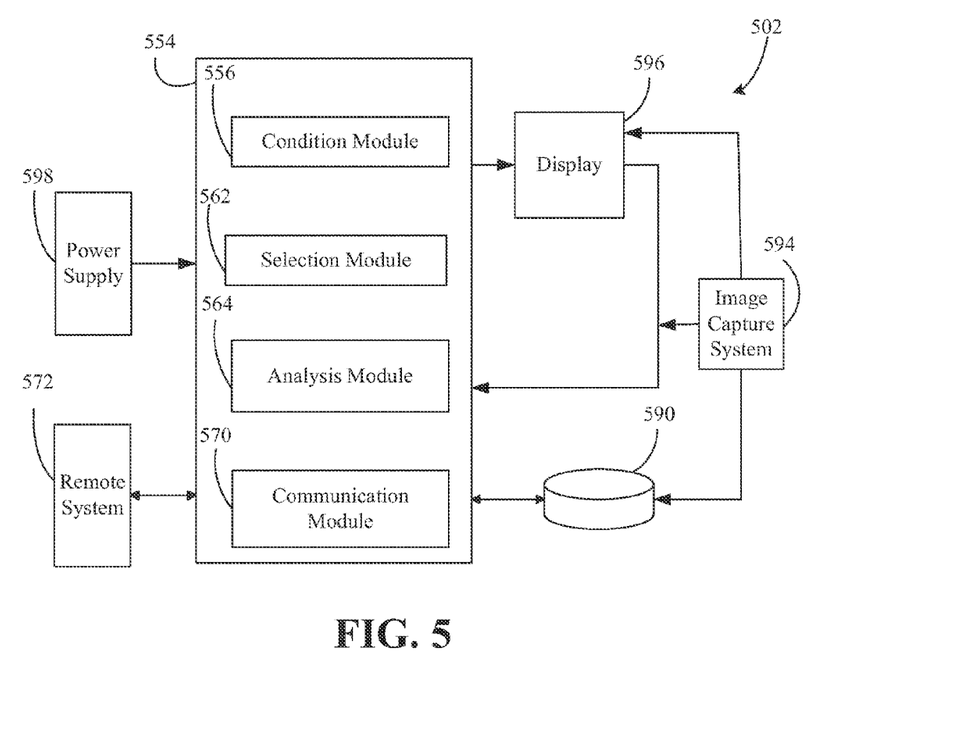
FIG. 5 is a block diagram of an example of a system according to an embodiment.

FIG. 5 shows a block diagram of an example of a system 502 to obtain AR information. The system 502 may include a logic architecture 554 in combinations with other system components, such as a power supply 598 to supply power to the system 502, a display 596 to present the video together with the AR information, image capture system 594 to provide video to the system 502, system memory (not shown), mass storage (not shown), network interface component (not shown), and so on, or combinations thereof. In addition, the system 502 may include dedicated components to receive or process an image, such as a dedicated graphic component including dedicated graphics memory (not shown).

In the illustrated example, the system 502 includes a condition module 556 to detect an acceleration condition, such as a low acceleration condition, with respect to the image capture system 592. The image capture system 594 may include camera, which may be connected with the display 596. In addition, the system 502 includes a selection module 562 to select data from a video provided by the image capture system 594, in response to the low acceleration condition. Moreover, the system 502 includes an analysis module 564 to analyze the data and obtain the AR information. Also, the system 502 includes a communication module 570 that communicates with other system components, such as the storage 490, and with the remote system 572. In one embodiment, the remote system 572 may include a database of images, for example to accomplish a pair-wise comparison. Any of the modules 546, 562, 564, or 570 may also be included in the remote system 572. In the illustrated example, the system 502 may present video, for example from the storage 590, the image capture system 594, and so on, that has been modified with the AR information.

Figure 6:
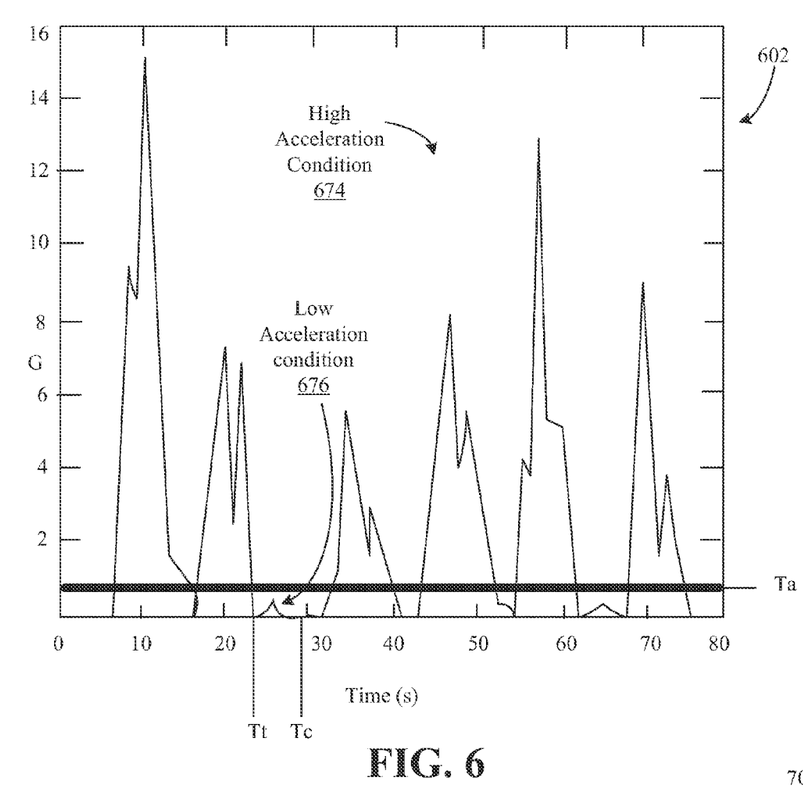
FIG. 6 is a plot of an example to Obtain AR information based on a low acceleration condition with respect to an image capture device according to an embodiment.

Turning now to FIG. 6, a plot 602 of an example to obtain AR information based on a low acceleration condition with respect to an image capture device is shown. In the illustrated example, the plot 602 relates an accelerometer vector (G) that is associated with a platform to a temporal variable (e.g., time). The accelerometer vector (G) includes three dimensions (e.g., $g_x$, $g_y$, $g_z$). The absolute value of the vector is obtained using the following computation:

$$G=\sqrt{g_x^2+g_y^2+g_z^2} \quad (1)$$

When G is equal to zero (0), there may be a static state or constant velocity motion. G may be directly related to panning speed of an image capture device, which may be in transition between three states: static, burst motion, and non-regular motion. Since motion values may include noise, an acceleration threshold value (Ta) may be used to classify the video using a high acceleration condition 674 and a low acceleration condition 676. For example, when sensor data (e.g., G) falls below the acceleration threshold value (Ta), the low acceleration condition 676 is declared for the image capture device. In addition, when sensor data does not fall below the acceleration threshold value (Ta), the high acceleration condition 674 is declared for the image capture device. Accordingly, the low acceleration condition 676 may be detected, a transition from the high acceleration condition 674 to the low acceleration condition 676 may be identified, and the video may be classified by relating the conditions 674, 676 to portions of the video captured during the high acceleration condition 674, the low acceleration condition 676, and combinations thereof.

In addition, a run length time may be used to detect an acceleration condition. For example, a run length time may be measured for each low acceleration condition, which may represent the time that the acceleration condition remains constant. Accordingly, the condition (or video classification) may not change until, or unless, the run length time exceeds a classification threshold value (Tc). Thus, relatively rapid temporal oscillations in a detection of a condition may be suppressed. Moreover, using a motion sensor (e.g., accelerometer) to determine differences in a motion vector (e.g., G) between a current movement and a previous movement may allow for the selection or transmission of data (e.g., a query frame) to be accomplished when the differences exceed a predefined threshold. Similarly, when the differences between the motion vectors are relatively small, no frames are required to be selected or transmitted.

The data may be selected based on a predetermined period during an acceleration condition. For example, the data may be selected at the start of every time there is the low acceleration condition 676, randomly selected in a period in the low acceleration condition 676 from the start time (e.g., 0 seconds), from the beginning of a transition (Tt) into the low acceleration condition 676, for a period between the beginning of the transition (Tt) to the classification threshold value (Tc), between the classification threshold value (Tc) and a transition to the high acceleration threshold (e.g., at Ta), and so on, or combinations thereof. Accordingly, an average query frame between approximately 50 Kb and 60 Kb, for a 640×480 size image, may be quickly transmitted. In one embodiment, a frame such as a JPEG compressed viewfinder frame, may be selected or transmitted. Moreover, there may be relatively low computation cost or power usage, as well as maximized accuracy due to relatively low/still motion classification associated with a user attention model.

Figure 7:
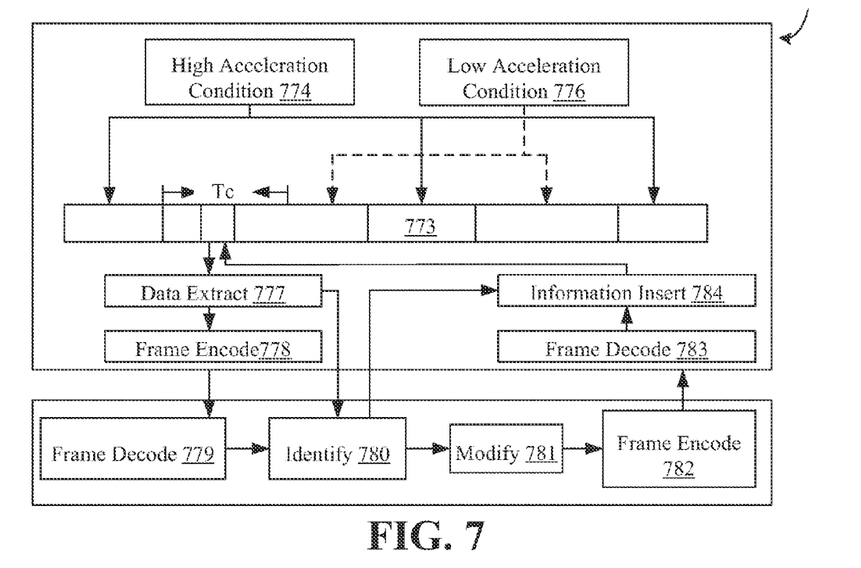
FIG. 7 is a block diagram of an example of a system including a flow to obtain AR information based on a low acceleration condition with respect to an image capture device according to an embodiment.

FIG. 7 shows a block diagram of an example of a system 702 including a flow to obtain AR information, to modify a video stream 773, based on a low acceleration condition. In the illustrated example, the system 702 detects a high acceleration condition 774 and a low acceleration condition 776, and relates the conditions 774, 776 to respective portions of the video stream 773. Data (e.g., a query frame) of the video stream 773 in the low acceleration condition 776 is selected based on a predetermined period during the low acceleration condition 776, such as when a classification threshold value (Tc) is exceeded. The data (e.g., the query frame) is extracted at data extract 777. The data may be encoded at frame encode 778, and forwarded to a remote processor, apparatus, system, and so on, or combinations thereof. In one embodiment, the data is forwarded to a remote image database server. Where the data is forwarded, it may be decoded at frame decode 779 and then used to obtain AR information at identify operation 780. Moreover, the data may directly be employed after the data extract 777 to obtain AR information at an identify operation 780.

The data may be used to modify the video stream 773 with the AR information. When the data is extracted at the data extract 777 and directly used to obtain identification information at identify operation 780, the AR information may be forwarded directly to information insert operation 784. When the data is forwarded to a remote location, the AR information may modify the data (e.g., query image) at a modify operation 781, and the modified data (e.g., modified query image) may be encoded at frame encode 782. The modified data may be decoded at frame decode 783, and forwarded to information insert 784. At the information insert 784, the AR information from the identify operation 780 may be inserted into the original frame in the video stream 773, the original frame may be replaced with the modified frame from the modify operation 781 in the video stream 773, or combinations thereof may be provided. Moreover, the AR information may be stored for later use. Similarly, identified features, objects, images, and so on, may be inserted at information insert 784 corresponding to the data selected or extracted at data extract 777, to the identify operation 781, to the modify operation at 782, the information insert 784, and so on, or combinations thereof.

Figure 8:
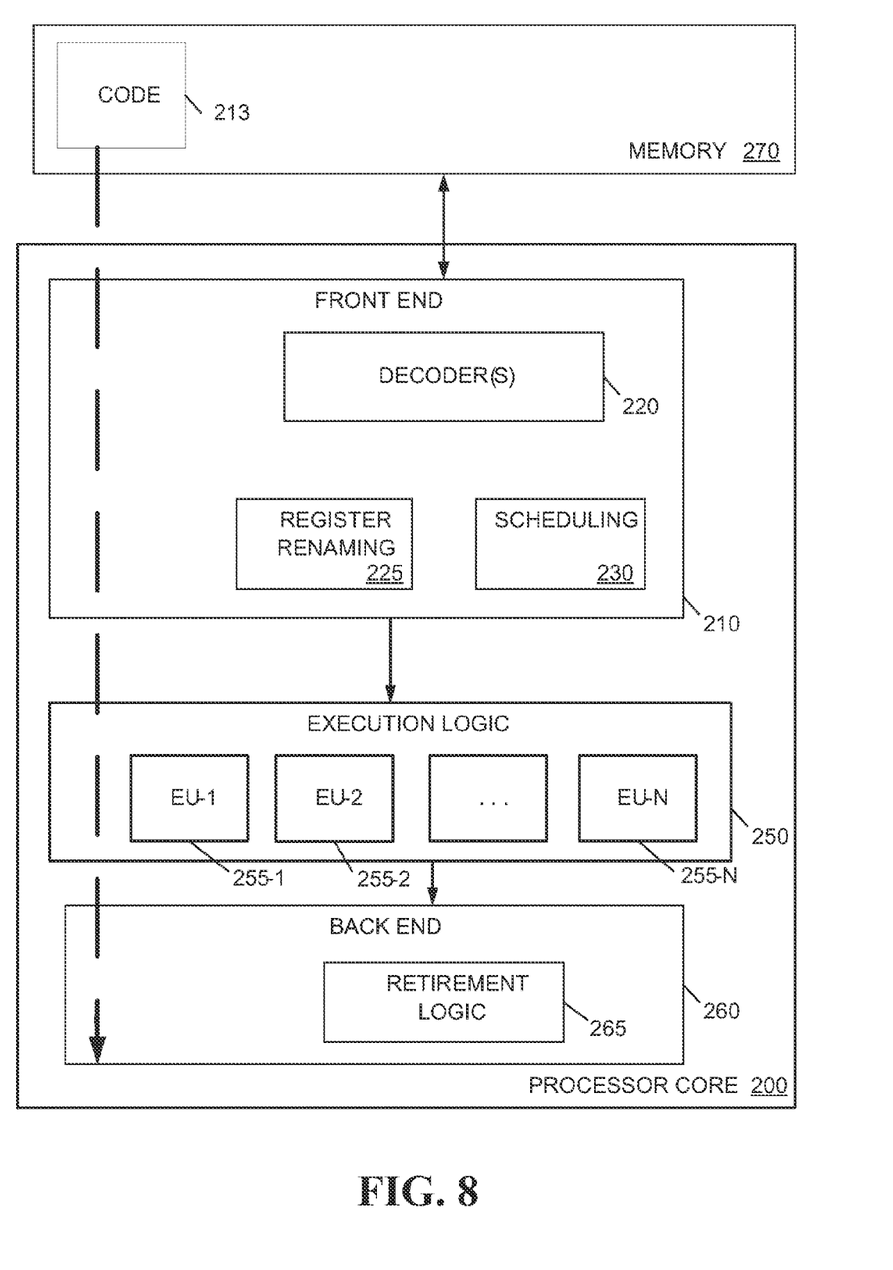
FIG. 8 is a block diagram of an example of a processor according to an embodiment.

FIG. 8 illustrates a processor core 200 according to one embodiment. The processor core 200 may be the core for any type of processor, such as a micro-processor, an embedded processor, a digital signal processor (DSP), a network processor, or other device to execute code. Although only one processor core 200 is illustrated in FIG. 8, a processing element may alternatively include more than one of the processor core 200 illustrated in FIG. 8. The processor core 200 may be a single-threaded core or, for at least one embodiment, the processor core 200 may be multithreaded in that it may include more than one hardware thread context (or "logical processor") per core.

FIG. 8 also illustrates a memory 270 coupled to the processor 200. The memory 270 may be any of a wide variety of memories (including various layers of memory hierarchy) as are known or otherwise available to those of skill in the art. The memory 270 may include one or more code 213 instruction(s) to be executed by the processor 200 core, wherein the code 213 may implement the logic architecture 454 (FIG. 4) or the logic 554 (FIG. 5), already discussed. The processor core 200 follows a program sequence of instructions indicated by the code 213. Each instruction may enter a front end portion 210 and be processed by one or more decoders 220. The decoder 220 may generate as its output a micro operation such as a fixed width micro operation in a predefined format, or may generate other instructions, microinstructions, or control signals which reflect the original code instruction. The illustrated front end 210 also includes register renaming logic 225 and scheduling logic 230, which generally allocate resources and queue the operation corresponding to the convert instruction for execution.

The processor 200 is shown including execution logic 250 having a set of execution units 255-1 through 255-N. Some embodiments may include a number of execution units dedicated to specific functions or sets of functions. Other embodiments may include only one execution unit or one execution unit that can perform a particular function. The illustrated execution logic 250 performs the operations specified by code instructions.

After completion of execution of the operations specified by the code instructions, back end logic 260 retires the instructions of the code 213. In one embodiment, the processor 200 allows out of order execution but requires in order retirement of instructions. Retirement logic 265 may take a variety of forms as known to those of skill in the art (e.g., re-order buffers or the like). In this manner, the processor core 200 is transformed during execution of the code 213, at least in terms of the output generated by the decoder, the hardware registers and tables utilized by the register renaming logic 225, and any registers (not shown) modified by the execution logic 250.

Although not illustrated in FIG. 8, a processing element may include other elements on chip with the processor core 200. For example, a processing element may include memory control logic along with the processor core 200. The processing element may include I/O control logic and/or may include I/O control logic integrated with memory control logic. The processing element may also include one or more caches.

Figure 9:
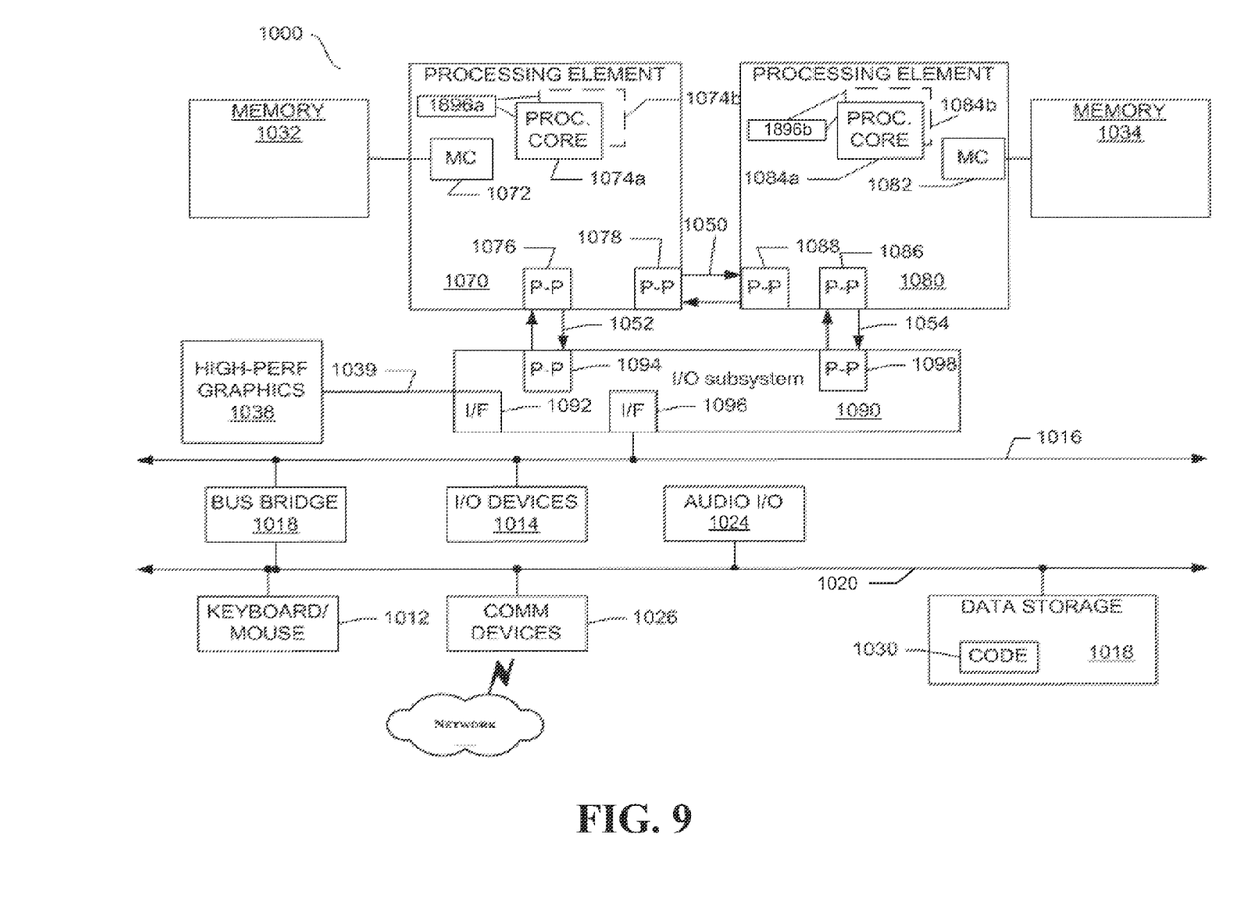
FIG. 9 is a block diagram of an example of a system according to an embodiment.

Referring now to FIG. 9, shown is a block diagram of a system embodiment 1000 in accordance with an embodiment of the present invention. Shown in FIG. 9 is a multi-processor system 1000 that includes a first processing element 1070 and a second processing element 1080. While two processing elements 1070 and 1080 are shown, it is to be understood that an embodiment of system 1000 may also include only one such processing element.

System 1000 is illustrated as a point-to-point interconnect system, wherein the first processing element 1070 and second processing element 1080 are coupled via a point-to-point interconnect 1050. It should be understood that any or all of the interconnects illustrated in FIG. 9 may be implemented as a multi-drop bus rather than point-to-point interconnect.

As shown in FIG. 9, each of processing elements 1070 and 1080 may be multicore processors, including first and second processor cores (i.e., processor cores 1074a and 1074b and processor cores 1084a and 1084b). Such cores 1074, 1074b, 1084a, 1084b may be configured to execute instruction code in a manner similar to that discussed above in connection with FIG. 8.

Each processing element 1070, 1080 may include at least one shared cache 1896. The shared cache 1896a, 1896b may store data (e.g., instructions) that are utilized by one or more components of the processor, such as the cores 1074a, 1074b and 1084a, 1084b, respectively. For example, the shared cache may locally cache data stored in a memory 1032, 1034 for faster access by components of the processor. In one or more embodiments, the shared cache may include one or more mid-level caches, such as level 2 (L2), level 3 (L3), level 4 (L1), or other levels of cache, a last level cache (LLC), and/or combinations thereof While shown with only two processing elements 1070, 1080, it is to be understood that the scope of the present invention is not so limited. In other embodiments, one or more additional processing elements may be present in a given processor. Alternatively, one or more of processing elements 1070, 1080 may be an element other than a processor, such as an accelerator or a field programmable gate array. For example, additional processing element(s) may include additional processors(s) that are the same as a first processor 1070, additional processor(s) that are heterogeneous or asymmetric to processor a first processor 1070, accelerators (such as, e.g., graphics accelerators or digital signal processing (DSP) units), field programmable gate arrays, or any other processing element. There can be a variety of differences between the processing elements 1070, 1080 in terms of a spectrum of metrics of merit including architectural, microarchitectural, thermal, power consumption characteristics, and the like. These differences may effectively manifest themselves as asymmetry and heterogeneity amongst the processing elements 1070, 1080. For at least one embodiment, the various processing elements 1070, 1080 may reside in the same die package.

First processing element 1070 may further include memory controller logic (MC) 1072 and point-to-point (P-P) interfaces 1076 and 1078. Similarly, second processing element 1080 may include a MC 1082 and P-P interfaces 1086 and 1088. As shown in FIG. 8, MC's 1072 and 1082 couple the processors to respective memories, namely a memory 1032 and a memory 1034, which may be portions of main memory locally attached to the respective processors. While the MC logic 1072 and 1082 is illustrated as integrated into the processing elements 1070, 1080, for alternative embodiments the MC logic may be discrete logic outside the processing elements 1070, 1080 rather than integrated therein.

The first processing element 1070 and the second processing element 1080 may be coupled to an I/O subsystem 1090 via P-P interconnects 1076, 1086 and 1084, respectively. As shown in FIG. 9, the I/O subsystem 1090 includes P-P interfaces 1094 and 1098. Furthermore, I/O subsystem 1090 includes an interface 1092 to couple I/O subsystem 1090 with a high performance graphics engine 1038. In one embodiment, bus 1049 may be used to couple graphics engine 1038 to I/O subsystem 1090. Alternately, a point-to-point interconnect 1039 may couple these components.

In turn, I/O subsystem 1090 may be coupled to a first bus 1016 via an interface 1096. In one embodiment, the first bus 1016 may be a Peripheral Component Interconnect (PCI) bus, or a bus such as a PCI Express bus or another third generation I/O interconnect bus, although the scope of the present invention is not so limited.

As shown in FIG. 9, various I/O devices 1014 such as the screen 14 (FIGS. 1A and 1B), the display 496 (FIG. 4) or the display 596 (FIG. 5) may be coupled to the first bus 1016, along with a bus bridge 1018 which may couple the first bus 1016 to a second bus 1010. In one embodiment, the second bus 1020 may be a low pin count (LPC) bus. Various devices may be coupled to the second bus 1020 including, for example, a keyboard/mouse 1012, communication device(s) 1026 (which may in turn be in communication with a computer network), and a data storage unit 1018 such as a disk drive or other mass storage device which may include code 1030, in one embodiment. The code 1030 may include instructions for performing embodiments of one or more of the methods described above. Thus, the illustrated code 1030 may implement the logic architecture 454 (FIG. 4) or the logic architecture 554 (FIG. 5) and could be similar to the code 213 (FIG. 8), already discussed. Further, an audio I/O 1024 may be coupled to second bus 1020.

Note that other embodiments are contemplated. For example, instead of the point-to-point architecture of FIG. 9, a system may implement a multi-drop bus or another such communication topology. Also, the elements of FIG. 9 may alternatively be partitioned using more or fewer integrated chips than shown in FIG. 9.

Embodiments may include a computer-implemented method in which AR information may be obtained. The computer-implemented method may include detecting an acceleration condition with respect to an image capture device. The acceleration condition may include a low acceleration condition, a high acceleration condition, or combinations thereof. The detecting may include identifying a transition between a high acceleration condition to the low acceleration condition. The detecting may be based on an acceleration threshold value, a classification threshold value, or combinations thereof.

The computer-implemented method may also include selecting data from a video associated with the image capture device in response to the acceleration condition, for example in response to the low acceleration condition. The data may include a feature, a query image, and so on, or combinations thereof. The selecting may include extracting the feature from the video, the query image from the video, or combinations thereof. The selecting may be based on a predetermined period during the acceleration condition, such as during the low acceleration condition. The computer-implemented method may further include using the data to obtain AR information for the video. The computer-implemented method may also include modifying the video with the AR information, displaying the video with the AR information, or combinations thereof.

Embodiments may also include a computer-readable storage medium having a set of instructions, which, if executed by a processor, may cause a processor to obtain AR information. The instructions, if executed, may cause a processor to detect an acceleration condition, such as a low acceleration condition, with respect to an image capture device. The instructions, if executed, may cause a processor to identify a transition between a high acceleration condition and the low acceleration condition. The instructions, if executed, may cause a processor to detect the acceleration condition, such as the low acceleration condition, based on an acceleration threshold value, a classification threshold value, or combinations thereof.

The instructions, if executed, may cause a processor to select data from a video associated with the image capture device in response to the low acceleration condition. The instructions, if executed, may cause a processor to extract a feature from the video, a query image from the video, or combinations thereof. The instructions, if executed, may cause a processor to select the data based on a predetermined period during the low acceleration condition. The instructions, if executed, may cause a processor to communicate the data to a remote processor to obtain the AR information. The instructions, if executed, may cause a processor to modify the video based on the augmented reality information, display the video with the augmented reality information, or combinations thereof.

Embodiments may also include an apparatus having logic to obtain AR information. The apparatus may include a condition module to detect an acceleration condition, such as a low acceleration condition, with respect to an image capture device. The condition module may include an acceleration module to detect a high acceleration condition, the low acceleration condition, when an acceleration threshold value may be exceeded, or combinations thereof. The acceleration module may identify a transition between the low acceleration condition and the high acceleration condition. The condition module may include a classification module to detect when a classification threshold value may be exceeded.

The apparatus may include a selection module to select data from a video associated with the image capture device in response to the low acceleration condition, wherein the data may be used to obtain AR information for the video. The selection module may extract a feature from the video, a query image from the video, or combinations thereof. The selection module may select the data based on a predetermined period during an acceleration condition, such as the low acceleration condition.

The apparatus may include an analysis module to analyze the data. The analysis module may include a data identity module to identify data in the video, a data information module to identify information related to the data in the video, or combinations thereof. The apparatus may include a communication module to communicate the data to a remote apparatus to obtain the AR information. The apparatus may include a display to present the video with the AR information.

Embodiments may also include a system having logic to obtain AR information. The system may include a condition module to detect an acceleration condition, such as a low acceleration condition, with respect to an image capture device. The condition module may include an acceleration module to detect a high acceleration condition, the low acceleration condition, when an acceleration threshold value may be exceeded, or combinations thereof. The acceleration module may identify a transition between the low acceleration condition and the high acceleration condition. The condition module may include a classification module to detect when a classification threshold value may be exceeded.

The system may include a selection module to select data from a video associated with the image capture device in response to the low acceleration condition, wherein the data may be used to obtain AR information for the video. The selection module may extract a feature from the video, a query image from the video, or combinations thereof. The selection module may select the data based on a predetermined period during an acceleration condition, such as the low acceleration condition.

The system may include an analysis module to analyze the data. The analysis module may include a data identity module to identify data in the video, a data information module to identify information related to the data in the video, or combinations thereof. The system may include a communication module to communicate the data to a remote apparatus to obtain the AR information.

The system may include logic in combination with a system component, such as a power supply, a user interface, image capture system, system memory, network interface component, and so on, or combinations thereof. Moreover, the system may include a sensor, such as a motion sensor. The system may include a display to present the video with the AR information. The system may include storage to store the video, the data, the augmented reality information, or combinations thereof. The data may include an image of an object in the video, which may be presented with the AR information after the object is outside of a visual field of the image capture device.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Embodiments of the present invention are applicable for use with all types of semiconductor integrated circuit ("IC") chips. Examples of these IC chips include but are not limited to processors, controllers, chipset components, programmable logic arrays (PLAs), memory chips, network chips, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments of the present invention are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments of the invention. Further, arrangements may be shown in block diagram form in order to avoid obscuring embodiments of the invention, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments of the invention, it should be apparent to one skilled in the art that embodiments of the invention can be practiced without, or with variation of these specific details. The description is thus to be regarded as illustrative instead of limiting.

Some embodiments may be implemented, for example, using a machine or tangible computer-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, object-oriented, visual, compiled and/or interpreted programming language.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated. Additionally, it is understood that the indefinite articles "a" or "an" carries the meaning of "one or more" or "at least one".

Those skilled in the art will appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

We claim:

1. A method comprising:
    detecting a low acceleration condition of an image capture device based on sensor data from a motion sensor of the image capture device, wherein the detecting includes identifying a transition between a high acceleration condition of the image capture device and the low acceleration condition of the image capture device;
    selecting data from a video associated with the image capture device in response to the low acceleration condition, wherein the data includes one or more of a feature captured during the low acceleration condition, an object captured during the low acceleration condition, a query image captured during the low acceleration condition, and a frame captured during the low acceleration condition, and wherein the selecting includes extracting one or more of the feature, the object, the query image, and the frame; and
    using the data to obtain augmented reality information for the video.

2. The method of claim 1, wherein the detecting is to be based on one or more of:
    an acceleration threshold value, wherein the low acceleration condition is declared when an acceleration vector falls below the acceleration threshold value; and
    a classification threshold value, wherein the low acceleration condition is declared when a run length time exceeds the classification threshold value.

3. The method of claim 1, wherein the selecting is to be based on a predetermined period during the low acceleration condition that delays a declaration of the low acceleration condition.

4. The method of claim 1, further including one or more of:
    modifying the video with the augmented reality information; and
    displaying the video with the augmented reality information.

5. A non-transitory computer-readable medium comprising one or more instructions that when executed on a processor cause the processor to:
    detect a low acceleration condition of an image capture device based on sensor data from a motion sensor of the image capture device, wherein to detect is to include to identify a transition between a high acceleration condition of the image capture device and the low acceleration condition of the image capture device;
    select data from a video associated with the image capture device in response to the low acceleration condition, wherein the data is to include one or more of a feature to be captured during the low acceleration condition, an object to be captured during the low acceleration condition, a query image to be captured during the low acceleration condition, and a frame to be captured during the low acceleration condition, and wherein to select is to include to extract one or more of the feature, the object, the query image, and the frame; and
    use the data to obtain augmented reality information for the video.

6. The medium of claim 5, wherein when executed the one or more instructions configure a processor to detect the low acceleration condition based on one or more of:
    an acceleration threshold value, wherein the low acceleration condition is to be declared when an acceleration vector falls below the acceleration threshold value; and
    a classification threshold value, wherein the low acceleration condition is to be declared when a run length time exceeds the classification threshold value.

7. The medium of claim 5, wherein when executed the one or more instructions configure a processor to select the data based on a predetermined period during the low acceleration condition that is to delay a declaration of the low acceleration condition.

8. The medium of claim 5, wherein when executed the one or more instructions configure a processor to communicate the data to a remote processor to obtain the augmented reality information.

9. The medium of claim 5, wherein when executed the one or more instructions configure a processor to analyze the data based on one or more of:
    a data identity determination to identify the data in the video; and
    a data information determination to identify information related to the data in the video.

10. The medium of claim 5, wherein when executed the one or more instructions configure a processor to one or more of:

modify the video based on the augmented reality information; and
display the video with the augmented reality information.

11. An apparatus comprising:
a condition logic, implemented at least partly in one or more of configurable logic or fixed functionality logic hardware, to detect a low acceleration condition of an image capture device based on sensor data from a motion sensor of the image capture device, wherein to detect is to include to identify a transition between a high acceleration condition of the image capture device and the low acceleration condition of the image capture device; and
a selection logic, implemented at least partly in one or more of configurable logic or fixed functionality logic hardware, to select data from a video associated with the image capture device in response to the low acceleration condition, wherein the data is to include one or more of a feature to be captured during the low acceleration condition, an object to be captured during the low acceleration condition, a query image to be captured during the low acceleration condition, and a frame to be captured during the low acceleration condition, wherein to select is to include to extract one or more of the feature, the object, the query image, and the frame, and wherein the data is to be used to obtain augmented reality information for the video.

12. The apparatus of claim 11, wherein the condition logic is to include one or more of:
an acceleration logic, implemented at least partly in one or more of configurable logic or fixed functionality logic hardware, to detect one or more of the high acceleration condition and the low acceleration condition, wherein the high acceleration condition is to be declared when an acceleration vector does not fall below the acceleration threshold value, and wherein the low acceleration condition is to be declared when the acceleration vector falls below the acceleration threshold value; and
a classification logic, implemented at least partly in one or more of configurable logic or fixed functionality logic hardware, to detect when a classification threshold value is to be exceeded, wherein the low acceleration condition is to be declared when a run length time exceeds the classification threshold value.

13. The apparatus of claim 11, wherein the selection logic is to select the data based on a predetermined period during the low acceleration condition that is to delay a declaration of the low acceleration condition.

14. The apparatus of claim 11, further including a communication logic, implemented at least partly in one or more of configurable logic or fixed functionality logic hardware, to communicate the data to a remote apparatus to obtain the augmented reality information.

15. The apparatus of claim 11, further including an analysis logic, implemented at least partly in one or more of configurable logic or fixed functionality logic hardware, to analyze the data, wherein the analysis logic is to include one or more of:
a data identity logic, implemented at least partly in one or more of configurable logic or fixed functionality logic hardware, to identify the data in the video; and
a data information logic, implemented at least partly in one or more of configurable logic or fixed functionality logic hardware, to identify information related to the data in the video.

16. The apparatus of claim 11, further including a display to present the video with the augmented reality information.

17. A system comprising:
a power supply to provide power to the system;
a condition logic, implemented at least partly in one or more of configurable logic or fixed functionality logic hardware, to detect a low acceleration condition of an image capture device based on sensor data from a motion sensor of the image capture device, wherein to detect is to include to identify a transition between a high acceleration condition of the image capture device and the low acceleration condition of the image capture device; and
a selection logic, implemented at least partly in one or more of configurable logic or fixed functionality logic hardware, to select data from a video associated with the image capture device in response to the low acceleration condition, wherein the data is to include one or more of a feature to be captured during the low acceleration condition, an object to be captured during the low acceleration condition, a query image to be captured during the low acceleration condition, and a frame to be captured during the low acceleration condition, wherein to select is to include to extract one or more of the feature, the object, the query image, and the frame, and wherein the data is to be used to obtain augmented reality information for the video.

18. The system of claim 17, wherein the condition logic is to include one or more of:
an acceleration logic, implemented at least partly in one or more of configurable logic or fixed functionality logic hardware, to detect one or more of the high acceleration condition and the low acceleration condition, wherein the high acceleration condition is to be declared when an acceleration vector does not fall below the acceleration threshold value, and wherein the low acceleration condition is to be declared when the acceleration vector falls below the acceleration threshold value; and
a classification logic, implemented at least partly in one or more of configurable logic or fixed functionality logic hardware, to detect when a classification threshold value is to be exceeded, wherein the low acceleration condition is to be declared when a run length time is to exceed the classification threshold value.

19. The system of claim 17, wherein the selection logic is to select the data based on a predetermined period during the low acceleration condition that is to delay a declaration of the low acceleration condition.

20. The system of claim 17, further including a communication logic, implemented at least partly in one or more of configurable logic or fixed functionality logic hardware, to communicate the data to a remote system to obtain the augmented reality information.

21. The system of claim 17, further including an analysis logic, implemented at least partly in one or more of configurable logic or fixed functionality logic hardware, to analyze the data, wherein the analysis logic is to include one or more of:
a data identity logic, implemented at least partly in one or more of configurable logic or fixed functionality logic hardware, to identify the data in the video; and
a data information logic, implemented at least partly in one or more of configurable logic or fixed functionality logic hardware, to identify information related to the data in the video.

22. The system of claim 17, further including storage to store one or more of the video, the data, and the augmented reality information, wherein an element in the video is to be presented with the augmented reality information after the element is outside of a visual field of the image capture device.

* * * * *